2,785,599
Patented Mar. 19, 1957

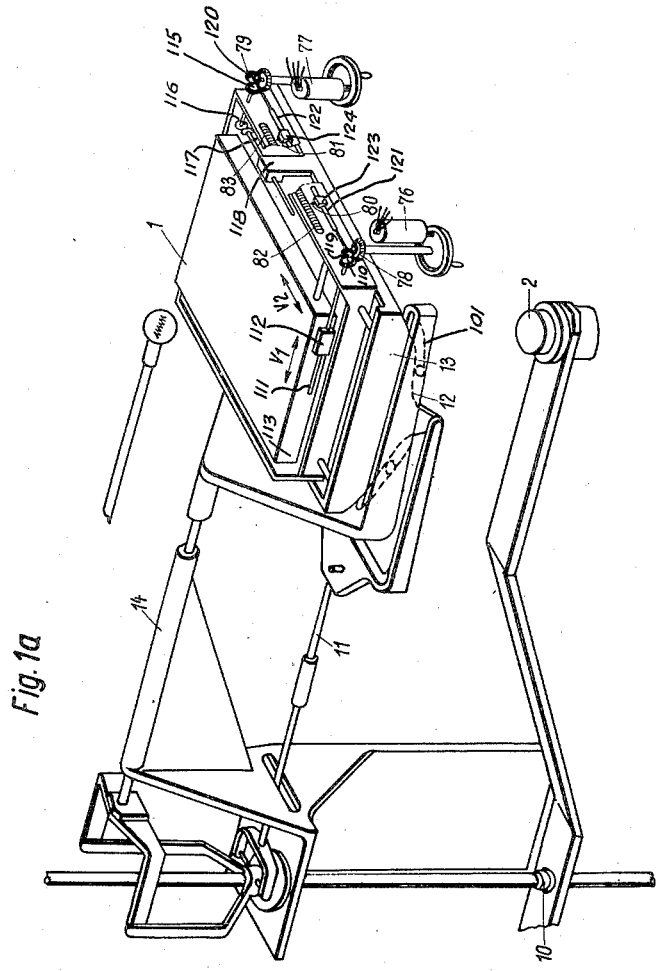

2,785,599

AUTOMATIC RECTIFICATION INSTRUMENT FOR PROJECTION PLOTTING OF MAPS

Heinrich Sonnberger and Hans Utz, Heidenheim (Brenz), Wurttemberg, Germany, assignors to Carl Zeiss, Heidenheim (Brenz), Wurttemberg, Germany Application December 28, 1954, Serial No. 478,004

Claims priority, application Germany January 2, 1954

9 Claims. (Cl. 88—24)

This invention relates to an automatic rectification instrument in which a control mechanism causes inclinations of the projection table to bring about a displacement of the photographic picture in the image plane corresponding to the vanishing point condition; in particular according to the approximation $$v = (f_e/2) \cdot ((f_a^2/f_e^2) - 1 + 1/n^2) w$$

where $v$ is the magnitude of the image displacement, $f_e$ the rectification focus, $f_a$ the camera focus, $n$ the magnification factor in the optical axis, and $w$ the tangent of the table inclination.

This arrangement is notable in that the control mechanism consists of a computing gear having a body slidable as a function of $f_a^2$ and $1/n^2$ which acts upon two multipliers each of them multiplying the displacement of the body with the tangent of the angle of the table inclination related to one direction of displacement of the image, and in that means are provided for transforming the products formed by the multipliers into the requisite displacements of the image.

By contrast with hitherto known instruments of this kind in which the image is moved only in one direction, and as the second possibility to steer the image, the image is turned around the optical axis, the advantage is reached that by displacing the image in two directions after the invention the settling of the image in a map will be much easier. Because in the known rectifiers for the displacement of the image in the one direction this displacement is effected by means of levers and slides, with the invention using multipliers the further advantage by dependable displacement of the image is reached something which, because of the employment of self-impeding gears is not true of the known control arrangements just referred to. On the other hand, the invention has the advantage over instruments which forego automatic image displacement because of the lack of dependability of known means of this kind, that fitting an image into a map demands considerably less time, say about one fourth of that hitherto required.

In a further elaboration of the invention, the sliding body acts upon two electric multipliers which multiply the displacement of the body each with one of the tangents of the table inclinations each inclination corresponding to one direction of the image displacement and that means are provided for converting the products obtained by the multipliers into corresponding components of the image displacement.

In the practical further design of the object of the invention, at least two plate cams joined by a transmission gear and rotatable in dependence of $n$ are provided for the displacement of the body as a function of $1/n^2$. These cams are so designed that a follower device sliding on them causes functional values near zero to be taken care of by fast turning cam, and $n$-values supplying relatively large functional values by a slow turning cam. Over the single plate cams customarily used, this has the advantage that the curve is to be regarded as stressed where of a great steepness. This is so because with plain plate cams, the curve declines very rapidly or very slowly by comparison with the larger functional values, depending upon whether $1/n^2$ or $n^2$ is to be formed, so that functional values outside of certain limits can either not be set at all or else only very inaccurately with the cam, seeing that this cam could only execute one turn.

In order to get the same advantage, the single cam must be in the form of a worm. This construction, however, is very expensive and is moreover troubled by the drawback that numerous rotations are needed to effect a sensible change, as for instance with smaller functional values when the formation of $1/n^2$ is required. If the cams of the invention are designed to furnish the value $n^2$, it will be of advantage to provide means for converting this value into $1/n^2$.

The principle of the coaction of the two plate cams used in the invention, however, remains unaltered. Preferably, the cams are disposed in a housing slidable proportionately to $f_a^2$, and the sliding body is located to advantage in a guideway of the housing. By using a suitable zero displacement point for the $f_a^2$ motion or by the follower actuated by the cams, it becomes very simple to represent the above parenthetic expression in the form of a displacement magnitude.

In a further elaboration of the invention, the electric multipliers are replaced by mechanical multipliers, this is preferable particularly when no unduly high precision is required for the image displacement and each multiplier may be in the form of a rail or bar capable of having its inclination set by means of the slidable body. In addition each rail has a slidable follower which rides with one end on the rail and is so designed that its axial displacement is proportional to the magnitude of the image displacement, and that its displacement perpendicular thereto is proportional to the tangent of the corresponding table inclination. With this form of multiplier, the means for transferring the axial displacement of the follower into image displacements are preferably mechanical.

In the electric form of multiplier, the slidable body is to advantage arranged to intercept on a potentiometer a voltage corresponding to its displacement, and to apply this voltage as the initial tension to multipliers in the form of further potentiometers, with a follower device intercepting on each further potentiometer a voltage corresponding to one of the tangents of the corresponding table inclinations. Since the voltages intercepted on the potentiometers are proportional, on the one hand to the initial tensions which can be taken as equal to the coil lengths of the potentiometers and on the other hand as equal to the length of the distance intercepted, the voltage intercepted on each potentiometer represents the product of the displacement of the body and the follower device in question.

For converting this product into the shift of the image, one electric motor can be used for each direction of motion, and of which each effects a displacement corresponding to the voltages intercepted by the follower. It will be advantageous to have each motor connected in the manner of the zero instrument of a Wheatstone bridge, with the follower device and a further potentiometer which supplies a tension proportionate to the image displacement, the motor running as long as it is under tension. When the image displacement is such that the potentiometer coupled with this displacement furnishes a voltage of the same magnitude as the follower device, then the differential voltage at the motor equals zero and the motor stops running, thereby terminating also the motion of the image in the direction pertinent to that motor.

It will be evident that the means just described insure dependable and all-automatic displacement of the image, and that the means stated for solving this problem can be employed to advantage also for image displacement by another approximation than the one referred to in the introduction, and then, if the image displacements take place only in one direction as mentioned above.

In the drawings, some representative designs of the object of the invention are shown:

Fig. 1, which for reasons of better clearness is separated into two figures, 1a and 1b, shows the rectifier, with an electric control of the image displacement, in perspective.

Figure 1B:
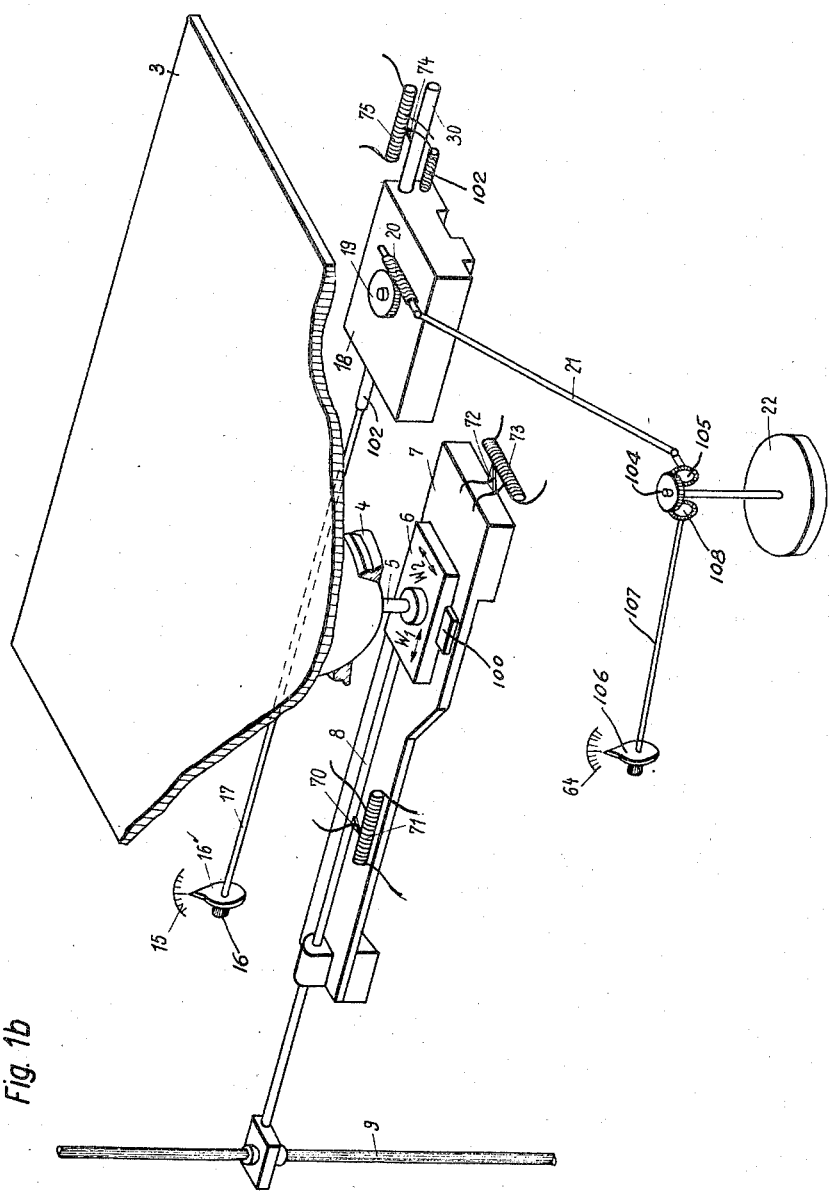
Figure 4A:
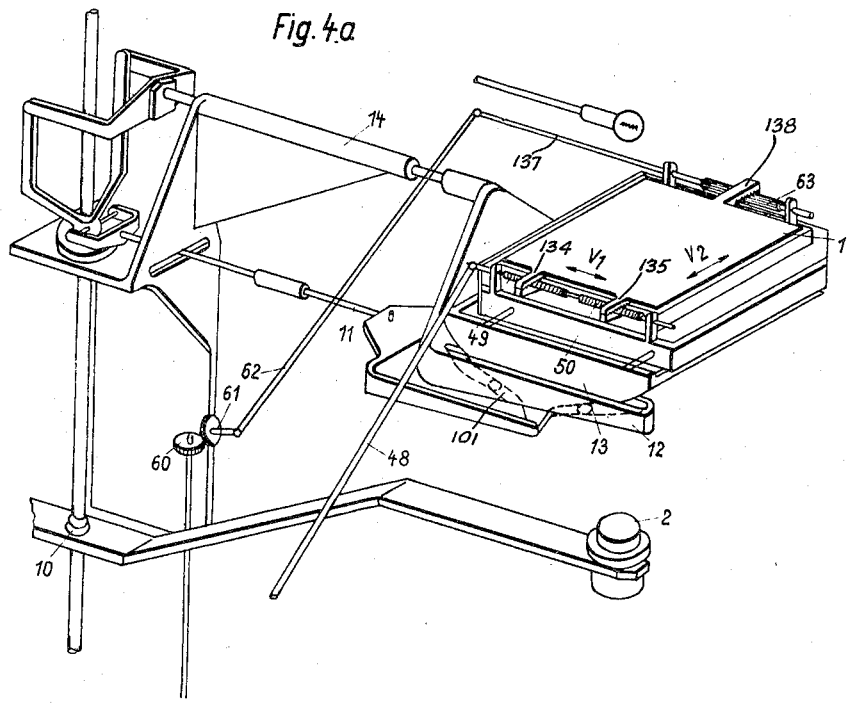
Figure 4B:
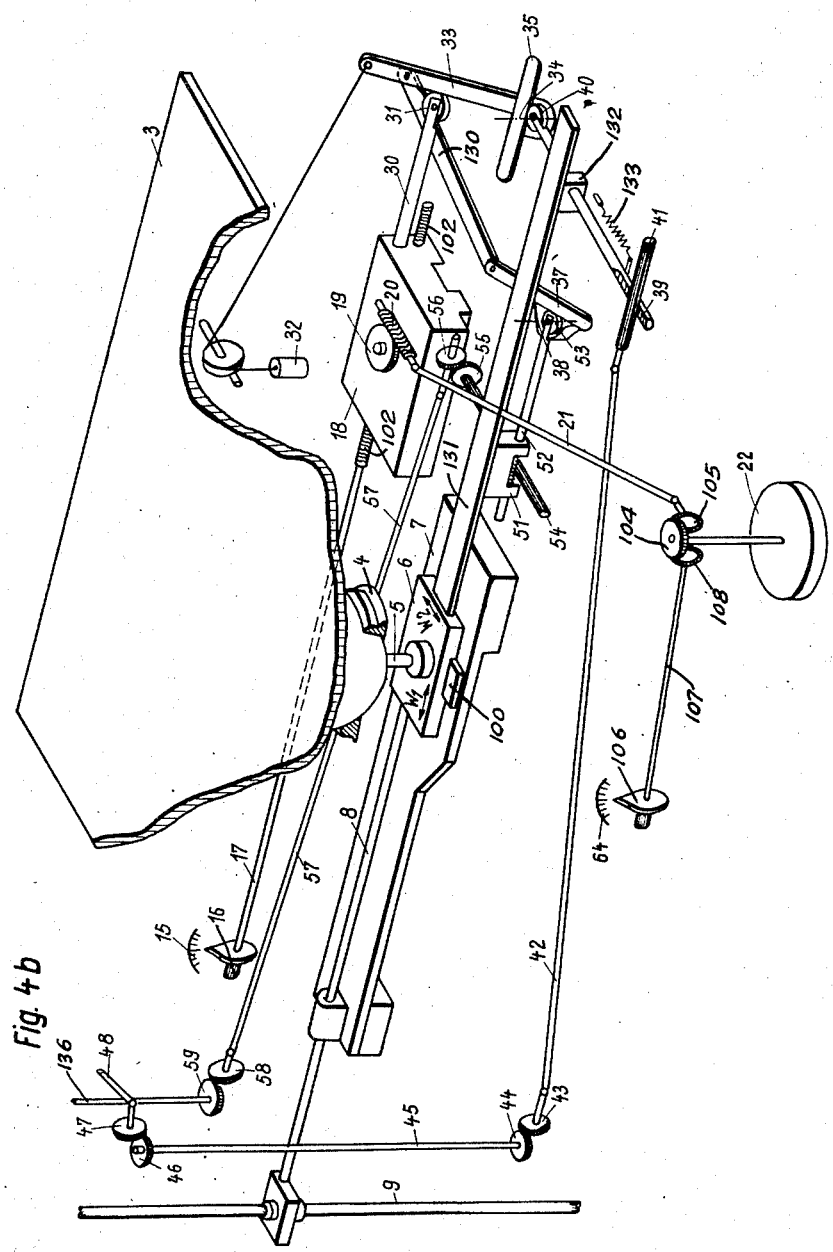

Fig. 4, separated for reasons of better clearness into 4a and 4b, shows the instrument of Fig. 1 with mechanical control of the image displacement.

Figure 5:
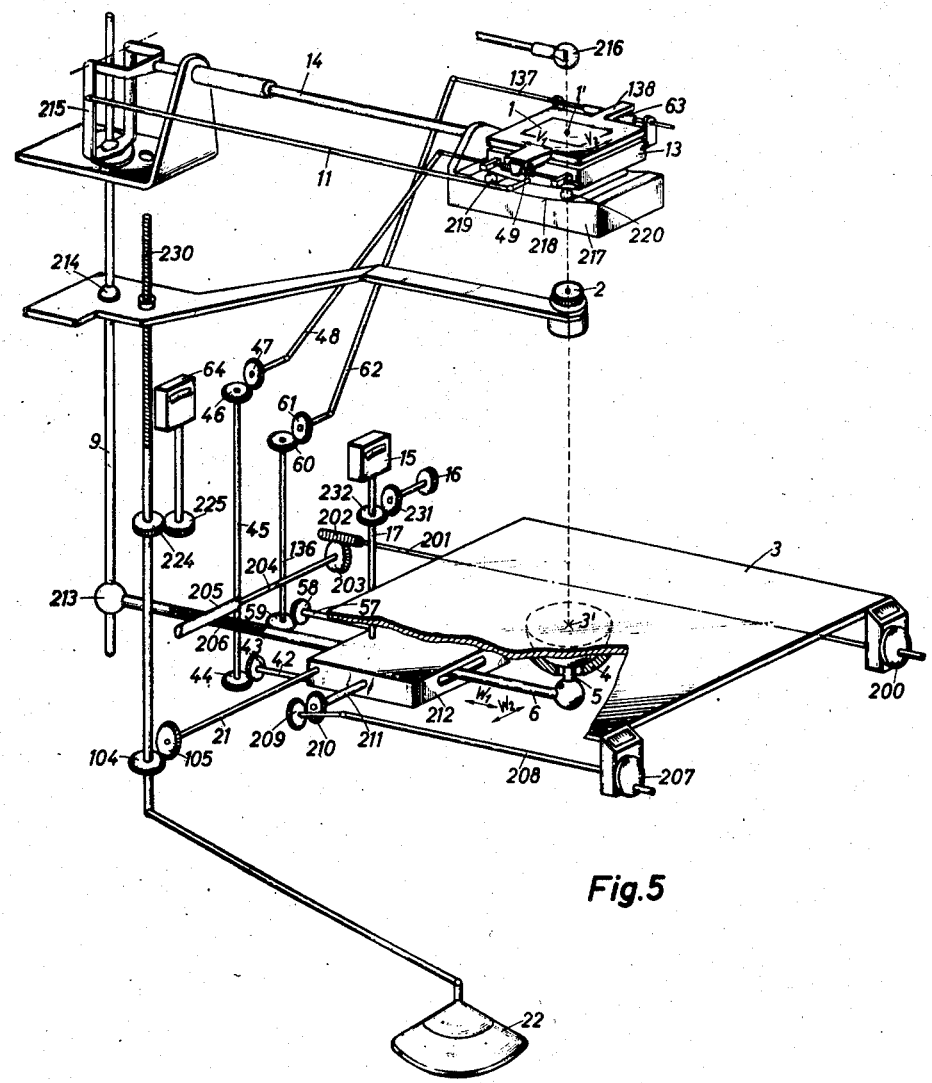

Fig. 5 is a view of the rectification instrument.

In Fig. 5 the light rays emanating from a light source 216 permeate an aerial picture 1. The aerial picture 1 is projected onto a projection table 3 by an objective 2.

The aerial picture 1 is arranged on a carrier 13 which can be displaced in the directions $v_1$ and $v_2$. The displacement in direction $v_1$ is effected by a worm 49, the displacement in direction $v_2$ by a pinion 63. The table 3 can be rotated in all directions in a hemispherical ball 4. The rotation in one direction ($w_1$) is initiated by a hand wheel 200, the rotary motion of the hand wheel 200 being transmitted via a shaft 201, worm 202 and gear 203, shaft 204, pinion 205 to a rack 206. This rack 206 is connected with a rod 6 which in turn displaces a lever 5 which is connected with the table 3. The rack 206, on the other hand, is connected via a ball pivot 213 with a rod 9 which is rotatable in a ball pivot 214. The movement of rod 9 is transmitted to a fork 215 which acts on carrier 13 via a rod 11, carrier 13 running on casters 219 and 220. The casters lie in an arch-shaped guide 218 of a carrier 217 so that carrier 13 when displaced by rod 11 is inclined.

When operating a hand wheel 207 a movement of rods 206 and 6 in the direction $w_2$ results via shaft 208, gears 209 and 210, flexible shaft 211 and in Fig. 5 not shown worms and gears. The table 3 therefore is inclined in the direction $w_2$. About rod 206, rod 9 is inclined in the same direction, rod 9 communicating its movement to fork 215 which now turns a shaft 14. The shaft 14 in turn inclines carrier 217 connected with it. Therefore, when inclining the table in the direction $w_2$, image 1 is also inclined in this direction.

At these table and image inclinations the principal point 1' is no longer projected onto position 3' of the stage. In order to image 1', as before in position 3', image 1 is further displaced in its plane when inclining table 3. The necessary displacing magnitudes are formed in a calculating gear 212. The calculator 212 transforms the displacing magnitudes $w_1$ and $w_2$ of rod 6 into magnitudes $v_1$ and $v_2$. The magnitude $v_1$ is transmitted to worm 49 via a shaft 42, gears 43 and 44 and shaft 45, gears 46 and 47 and a flexible shaft 48, worm 49 effecting the displacing of carrier 13 as previously described. Magnitude $v_2$ formed in the calculator 212 is transmitted to pinion 63 via shaft 57, gears 58 and 59, shaft 136, gears 60 and 61 and shafts 62 and 137, pinion 63 displacing carrier 13 in the direction of $v_2$ via rack 138.

The calculating gear 212 considers, as may be gathered from Figs. 1 to 4, the magnification factor $n$ of the projection of the aerial picture 1 on table 3. This table is set by means of a foot disk 22 which communicates its rotation via gears 104 and 105 and a shaft 21 to the calculating gear 212 on the one hand, and, on the other hand changes the distances between table 3 and objective 2 as well as between objective 2 and image 1 via a screw 230.

A scale 64 which is connected with the screw 230 via gears 224 and 225 indicates the value $n$.

The calculating gear 212 further considers the focal length $f_a$ of the taking objective and the focal length $f_e$ of the objective 2. By turning a shaft 17 by means of a rotary knob 16 via gears 231 and 232 shaft 17 in turn setting the calculating gear 212, corresponding to the rotation of knob 16 and on the other hand actuates a scale 15 which indicates a requisite value. The mode of operation of the calculating gear is illustrated in various forms of construction in Figs. 1 to 4.

In Figs. 1 to 4 rod 206 shifts a body 6' in the direction $w_1$ in making axial movements. Shaft 211 effects a shift of body 6' in direction $w_2$ over a worm 211' in turning. Body 6' is slidable for this movement in direction $w_1$ in a guide 100 of a body 7, and body 7 is shiftable in a guide 100' to allow movement of body 6' in direction $w_2$. Body 6' is connected with table 3 over lever 5 and the displacements of body 6' are proportional to the tangent of the inclination of the table 3 in the concerning direction and they are taken in the following equal to the tangent of the inclination of the table. Body 6' is connected with rod 206 by a bar 8.

For fitting in four image points into a map disposed on projection table 3, provision is made, besides for tilting image 1, also for displacing it in two directions within its plane. This displacement is represented in the directions $v_1$ and $v_2$ as governed by the displacements $w_1$ and $w_2$ of body 6 by the approximate vanishing point condition (1) $\quad v_i = (f_e/2) \cdot ((f_a^2/f_e^2) - 1 + 1/n^2) w_i : i = 1 : 2$ $f_e$ being constant as the focus of objective 2, $f_a$ being the camera focus, and $n$ the magnification factor in the projection of image 1 on table 3.

Figure 2:
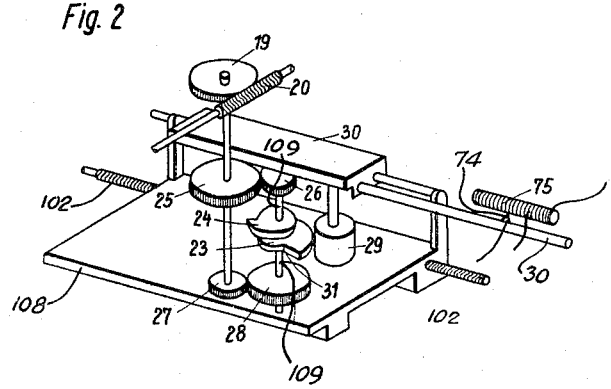
Fig. 2 shows the plate cam arrangement for forming the value $1/n^2$.

For entering value $f_a$, the scale 15 is graduated in terms of $f_a^2/f_e^2$, and on which the $F_a$ value is set by means of knob 16 and index 16'. In setting the $f_a$ value, a shaft 17 connected with knob 16 is caused to turn. Shaft 17 is in the form of a threaded spindle 102, so that rotation of shaft 17 causes a shift of housing 18 and base plate 103 of housing 18 proportional to $f_a^2/f_e^2$. Arranged in housing 18 and capable of rotation by means of a gear 19 are cams 23 and 24 as shown in Fig. 2. Gear 19 is driven through a worm 20, connected with the flexible shaft 21. Gear 19 rotates proportionally to $n$.

By transmissions 25/26 and 27/28, cam 24 is caused to rotate at 10 times the rate of cam 23. Shaft 109 is intercepted between cams 23 and 24. The cams 23 and 24 are so designed that a roller 29 intercepts the value $1/n^2$ and displaces a body 31' and a rod 30 by this amount. In this movement, roller 29 rolls on the curve of plate cam 23 when lesser valves of $n$ are concerned and continues with this motion as long as this curve is at a greater distance from the axis of rotation of the cams than the curve of the faster moving cam 24. At the point where both curves of cams 23 and 24 are equally far apart from the shaft 109 of rotation of the cams, the curve of 23 rapidly declines to zero, and roller 29 now continues to roll on cam 24, keeping this motion up until roller 29 runs against base circle 31 of cam 23.

The angle of rotation required for cam 23 amounts to about $\pi/5$, so that cam 24 has executed very nearly one full revolution. With this arrangement, there is complete assurance that a very exact displacement of body 30' by $1/n^2$ takes place. As shown in Figs. 1 and 4, rod 30 is carried in a guideway of housing 18, so that body 30 is displaced, on the one hand by the amount of $1/n^2$, and further by the amount $f_a^2/f_e^2$ by displacing of housing 18. By a suitable choice of the displacement zero point, the total displacement is (2) $\quad A = (f_a^2/f_e^2) - 1 + 1/n^2$ In Fig. 1, rod 30 carries a sliding contact 74, which intercepts, on a potentiometer 75, a voltage corresponding to the displacement of rod 30. Similar sliding contacts 70 and 72 are attached to rod 8 and body 7. These contacts, 70 and 72 intercept, in any displacement of bodies 6' and 7, in both directions $w_1$ and $w_2$ voltages corresponding to these displacements on potentiometers 71 and 73. The image displacement is effected through gears 78 and 79 by two electric motors 76 and 77. Motor 76 effects a shift in the direction $v_1$ by gear 110, spindle 111 and spindle sleeve 112 connected with a plate 113 carrying photo 1. Motor 77 effects a shift in the direction $v_2$ by gear 115, spindles 116 and 117 and sleeve 118 connected with plate 113. Connected with the gears 78 and 79 are sliding contacts 80 and 81 by gears 119 and 120, spindles 121 and 122 and spindle sleeves 123 and 124 each connected with one sliding contact. Said contacts 80 and 81 intercept voltages corresponding to the displacements $v_1$ and $v_2$ of image 1 on potentiometers 82 and 83.

Figure 3:
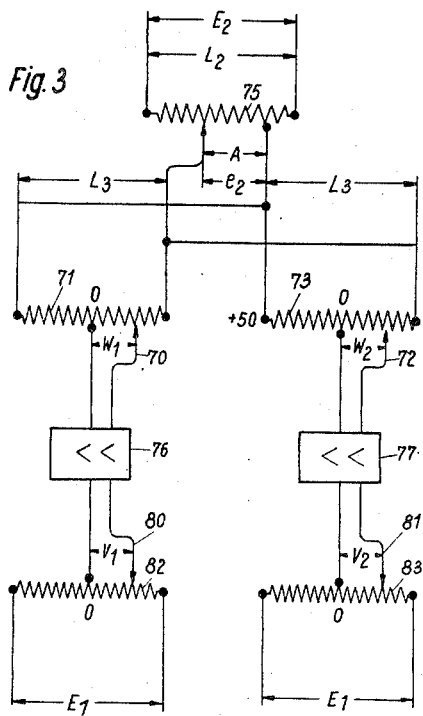
Fig. 3 is a circuit diagram for the electric control of Fig. 1.

Fig. 3 will serve in explaining the arrangement and mode of action of the potentiometers. Potentiometer 75 carries a constant voltage $E_2$. According to displacement A, sliding contact 74 intercepts the voltage $e_2 = (E_2/L_2) \cdot A$, where $L_2$ is the coil length of potentiometer 75. This tension $e_2$ is the initial voltage applied to potentiometers 71 and 73. In movements of sliding contact 70 by stretch $w_1$ or of sliding contact 72 by stretch $w_2$, the voltages $$e_3' = (e_2/L_3) \cdot w_1 = (E_2/L_2 L_3) \cdot A \cdot w_1$$

and $$e_3'' = (e_3/L_3) w_2 = (E_2/L_2 L_3) A w_2$$

are intercepted, $L_3$ being the coil length of potentiometers 71 and 73. As will be seen, the voltages intercepted are proportional to the products $A \cdot w_1$.

In the same way, a constant voltage $E_1$ is applied to potentiometers 82 and 83. $E_1$ may be identical with voltage $E_2$. When the image is shifted by the amounts $v_1$ and $v_2$, the sliding contacts 80 and 81 displaceable with image 1 intercept the voltages $e_1' = (E_1/L_1) v_1$, and $$e_1'' = (E_1/L_1) v_2$$

these amounts being proportional to the image shift. If the potentiometers 71 and 82, as well as 73 and 83 are considered as being the resistors of two Wheatstone bridges while the motors 76 and 77 are regarded as zero instruments of these bridges, then it will be seen that current can flow in motors 76 and 77 only when the voltages $e_1'$ are unequal to $e_3'$, or for motor 77 when $e_1''$ is unequal to $e_3''$. In this case, the motors turn and displace image 1, continuing until the sliding contacts 80 and 81 intercept a voltage just large enough to make $e_1' = e_3'$, or $e_1'' = e_3''$. At this instant, the current supply stops and the image displacements are completed.

Fig. 4 shows rod 30 in constant contact, by a sheave 31 under the pull of a lever 33 by a weight 32. The lever 33 turns about an axis 34 and is fixedly coupled to bar 35. In a shift of rod 30, the inclination of bar 35 changes to correspond. By way of rod 130 a further lever 37 being always parallel to lever 33 and turnable about an axis 38 is changed in respect to its inclination in dependence of the motion of rod 30. Body 6' carries with an arm 131 in a guide 132 a rack 39 capable of displacement in direction $w_2$. A spring 133 causes rack 39 to bear by a sheave 40 upon bar 35. When body 6' is shifted in the direction $w_1$, rack 39 participates in this motion, but is also displaced axially in proportion to the value of $u_1$.

By fixing the zero inclination of bar 35, the factor of proportionality is such as to cause this shift $u_1$ to equal $A \cdot w_1$, A having the significance of Equation 2. This motion is communicated by pinion 41, to the flexible shaft 42 which effects the shift of carrier 1 as described. The transmission used in this case is such as to displace the image by the amount $v_1$ according to Equation 1.

In a displacement of body 6' in direction $w_2$, the position of rack 39 relative to long pinion 41 remains unchanged because rack 39 is guided in guide 132. Arm 131, however, carries along a guide 51 attached to it and a rack 52 axially slidable in this guide member. Rack 52 has a sheave 53 which slides on bar 37. In being shifted in direction $w_2$, rack 52 is imparted through bar 37, an axial movement causing actuation of a pinion 54. The rotation of 54 is communicated over gears 55 and 56, to the flexible shaft 57, which displaces image 1 by the amount $v_2$ in the described manner.

To fit image points into a map, it is therefore necessary to enter only $f_a$ on scale 15, and by working disk 22, the magnification $n$ indicated on scale 64. On now slanting the projection table, image 1 is inclined by the rod 9 for sharply focusing all image points on the projection table, and in addition, the image is automatically shifted in consonance with the vanishing-point condition.

We claim:

1. In an automatic rectification instrument having a turnable projection table, an objective and a turnable and shiftable image such as a photographic view, said objective projecting said image on said table, means to alter the distance between said objective and said table as well as the distance between said objective and said image for varying the magnification of the projection and means inclining the image and said projection table, means to displace said image in its plane in two directions perpendicular to another, a control mechanism being engaged with said means displacing said image in its plane and being connected with said means altering the distance between said objective, said table and said image, and being connected with said means turning said table and said image, said control mechanism effecting a shift of said image in its plane in the one direction by the amount $v_1$ and in the other direction by the amount $v_2$ in inclining the table where $$v_{1,2} = (f_e/2) \cdot ((f_a^2/f_e^2) - 1 + 1/n^2) w_{1,2}$$

$f_e$ being the rectifying focus, $f_a$ the camera focus, $n$ the magnification factor in the optical axis; and $w_1$ the tangent of the table inclination in the direction corresponding $v_1$ and $w_2$ the tangent of the table inclination corresponding $v_2$.

2. In an automatic rectification instrument having a turnable projection table, an objective and a turnable and shiftable image such as a photographic view, said objective projecting said image on said table, means to alter the distance between said objective and said table as well as the distance between said objective and said image for varying the magnification of the projection and means inclining the image and said projection table, means to displace said image in its plane in two directions perpendicular to another, a control mechanism being engaged with said means displacing said image in its plane and being connected with said means altering the distance between said objective, said table and said image, and being connected with said means turning said table and said image, said control mechanism effecting a shift of said image in its plane in the one direction by the amount $v_1$ and in the other direction by the amount $v_2$ in inclining the table where $$v_{1,2} = (f_e/2) \cdot ((f_a^2/f_e^2) - 1 + 1/n^2) w_{1,2}$$

$f_e$ being the rectifying focus, $f_a$ the camera focus, $n$ the magnification factor in the optical axis, and $w_1$ the tangent of the table inclination in the direction corresponding $v_1$ and $w_2$ the tangent of the table inclination corresponding $v_2$, said control mechanism consisting of a computing gear having a body slidable as a function of $f_a^2$ and $1/n^2$ and two multipliers, said body acting upon said two multipliers, one of them multiplying the displacement of said body with the tangent of the angle of the table inclination $w_1$ related to the direction of displacement $v_1$ of the image and the other multiplying the displacement of said body with the tangent of the angle of the table inclination $w_2$ related to the direction of displacement $v_2$ of the image, and said multipliers acting on said means shifting said image in its plane.

3. In the automatic rectification instrument according to claim 2, the said multipliers are electric multipliers.

4. In an automatic rectification instrument having a turnable projection table, an objective and a turnable and shiftable image such as a photographic view, said objective projecting said image on said table, means to alter the distance between said objective and said table as well as the distance between said objective and said image for varying the magnification of the projection and means inclining the image and said projection table, means to displace said image in its plane in two directions perpendicular to another, a control mechanism being engaged with said means displacing said image in its plane and being connected with said means altering the distance between said objective, said table and said image, and being connected with said means turning said table and said image, said control mechanism effecting a shift of said image in its plane in the one direction by the amount $v_1$ and in the other direction by the amount $v_2$ in inclining the table where $$v_{1,2} = (f_e/2) \cdot ((f_a{}^2/f_e{}^2) - 1 + 1/n^2) w_{1,2}$$

$f_e$ being the rectifying focus, $f_a$ the camera focus, $n$ the magnification factor in the optical axis, and $w_1$ the tangent of the table inclination in the direction corresponding $v_1$ and $w_2$ the tangent of the table inclination corresponding $v_2$, said control mechanism consisting of a computing gear having a body slidable as a function of $f_a{}^2$ and $1/n^2$ and two multipliers, said body acting upon said two multipliers and each of them multiplying the displacement of the body with the tangent of the angle of the table inclination related to one direction of displacement of the image, and said multipliers acting upon said means shifting said image in its plane, having further means for displacing said body as a function of $1/n^2$ said means consisting in at least two plate cams and a transmission connecting said cams to let them run in different speeds in dependence of $n$, a follower device riding on said plate cams so as to get a shift for functional values located near zero by the fast turning cam, and for $n$-values giving a relatively large functional value by the slowly turning cam.

5. An automatic rectification instrument as in claim 4, characterized in that the cams form the value $n^2$ and means are provided to convert this value into $1/n^2$.

6. An automatic rectification instrument as in claim 4, characterized in that the cams are disposed in a housing capable of being displaced proportionately to $f_a{}^2$.

7. An automatic rectification instrument as in claim 4, characterized in that the cams are disposed in a housing capable of being displaced proportionately to $f_a{}^2$, and the slidable body is disposed in a guideway of the housing.

8. An automatic rectification instrument as in claim 2, characterized in that mechanical multipliers are provided, each consisting of a rail whose inclination is set by the slidable body, and that for either rail a slidable follower device is provided riding with one end of the rail, such that its axial displacement is proportionate to the image shift and its displacement in the perpendicular is proportionate to one of the tangents of the table inclination related to the two directions of image displacement.

9. An automatic rectification instrument as in claim 2, characterized in that the multipliers are electrical multipliers each having a first and a second potentiometer said slidable body intercepting on said first potentiometer a voltage corresponding to its displacement, each multiplier having further means applying this voltage as the initial voltage to said second potentiometer, and each multiplier having a follower device intercepting a voltage corresponding to one of the tangents of the table inclination on said second potentiometer.

References Cited in the file of this patent

UNITED STATES PATENTS

| | | |
|---|---|---|
| 752,596 | Scheimpflug | Feb. 16, 1904 |
| 1,565,413 | Brock et al. | Dec. 15, 1925 |
| 1,654,070 | Corlett et al. | Dec. 27, 1927 |
| 1,713,498 | Cooke | May 14, 1929 |
| 1,911,142 | Cahill | May 23, 1933 |
| 2,283,226 | Porter | May 19, 1942 |
| 2,387,555 | Bauersfeld | Oct. 23, 1945 |